(12) United States Patent
Black et al.

(10) Patent No.: US 7,689,383 B2
(45) Date of Patent: Mar. 30, 2010

(54) COMPONENT HEALTH ASSESSMENT FOR RECONFIGURABLE CONTROL

(75) Inventors: Scott E. Black, Godfrey, IL (US); Kirby J. Keller, Chesterfield, MO (US); Kevin Swearingen, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/717,736

(22) Filed: Nov. 20, 2003

(65) Prior Publication Data

US 2005/0114090 A1 May 26, 2005

(51) Int. Cl.
*G06F 15/00* (2006.01)
(52) U.S. Cl. ...................................... 702/183
(58) Field of Classification Search .................. 702/183
See application file for complete search history.

(56) References Cited

U.S. PATENT DOCUMENTS

| | | | |
|---|---|---|---|
| 4,345,191 A | 8/1982 | Takats et al. | |
| 4,542,679 A | 9/1985 | Murphy et al. | |
| 4,722,062 A | 1/1988 | Breitkopf et al. | |
| 4,807,516 A | 2/1989 | Takats | |
| 4,887,214 A | 12/1989 | Takats et al. | |
| 5,678,786 A * | 10/1997 | Osder ...................... | 244/17.13 |
| 5,806,805 A | 9/1998 | Elbert et al. | |
| 6,351,713 B1 * | 2/2002 | Board et al. .................. | 702/42 |
| 6,400,282 B1 * | 6/2002 | Germanetti ................. | 340/971 |
| 6,466,858 B1 | 10/2002 | Adibhatla et al. | |
| 6,532,412 B2 | 3/2003 | Adibhatla et al. | |

OTHER PUBLICATIONS

Raymond J. Anderson, McDonnell Douglas Corporation, St. Louis, Lab testing of neural networks for improving aircraft onboard-diagnostics on flight-ready hardware, processing Annual Reliability and Maintainability Symposium 1993, 0149.144X/93, IEEE 1993, p. 404-410.*
http://www.merriam-webster.com/dictionary/relay, p. 1, Apr. 17, 2008.*
James Antaki, Brad E. Paden, Michael J. Piovoso, and Siva S. Banda, IEEE Control Systems Magazine, Dec. 2002, p. 8-20.*
Gary G. Yen, Health Monitoring of Vibration Signatures in Rotorcraft Wings, Neural Processing Letters 4: 127-137, 1996. @ 1996 Kluwer Academic Publishers. Printed in the Netherlands.*

* cited by examiner

*Primary Examiner*—Tung S Lau

(57) ABSTRACT

Apparatus and methods for assessing component health for reconfigurable control are disclosed. In one embodiment, a method of operating a product includes monitoring a first diagnostic information of a component of the product, and monitoring a second diagnostic information of a system that includes the component. The first and second diagnostic informations are then combined, and based at least partially on the combined first and second diagnostic information at least one of the component and the system are reconfigured.

14 Claims, 5 Drawing Sheets

SENSOR PARAMETERS

- TIME > TIME [seconds]
- 8237 > CH.1 MAIN RAM POSITION [inches]
- 8238 > CH.2 MAIN RAM POSITION [inches]
- 8239 > CH. 1 MCV POSITION [inches]
- 8240 > CH. 2 MCV POSITION [inches]
- 8241 > CH. 1 SERVOAMP CURRENT [milliamps]
- 8242 > CH. 2 SERVOAMP CURRENT [milliamps]
- 8243 > CH. 3 SERVPAMP CURRENT [milliamps]
- 8244 > CH. 4 SERVOAMP CURRENT [milliamps]
- 8245 > CH. 2 FAIL SENSOR NO. 1 LVDT POSITION [Vrms]
- 8246 > CH. 2 FAIL SENSOR NO. 2 LVDT POSITION [Vrms]
- 8201 > STABILATOR ACTUATOR COMMAND [INCHES]
- 8268 > LOAD ACTUATOR COMMAND [pounds]
- 8312 > LOAD ACTUATOR LOAD CELL FORCE [LBS]
- 8430 > HYDRAULIC SYSTEM 1 FLUID TEMPERATURE [deg F]
- 8431 > HYDRAULIC SYSTEM 2 FLUID TEMPERATURE [deg F]
- 8432 > LOAD CYLINDER HYDRAULIC SUPPLY TEMPERATURE [deg F]
- 8433 > LOAD CYLINDER HYDRAULIC RETURN TEMPERATURE [deg F]
- 8015 > STABILATOR ACTUATOR SYSTEM 1 INLET PRESSURE [psi]
- 8016 > STABILATOR ACTUATOR SYSTEM 1 OUTLET PRESSURE [psi]
- 8013 > STABILATOR ACTUATOR SYSTEM 2 INLET PRESSURE [psi]
- 8014 > STABILATOR ACTUATOR SYSTEM 2 OUTLET PRESSURE [psi]

FIG.3

COMPONENT HEALTH ASSESSMENT FOR RECONFIGURABLE CONTROL

FIELD OF THE INVENTION

The present disclosure relates to apparatus and methods for assessing component health to permit product reconfiguration as needed, such as, for example, for assessing actuator health, diagnostics, prognosis, failures, and the like for reconfiguring a flight control system of an aircraft.

BACKGROUND OF THE INVENTION

Reliability adds value to almost all types of products. In fact, in many fields, the reliability of the various systems and sub-systems of a product may be crucial to customer satisfaction, and thus, to the success of the product on the market. In the field of aerospace products, for example, reliability may a leading factor in the capability, performance, and support costs of the product, all of which may greatly impact the product's marketability.

For example, aircraft, like most complex machines, are repairable systems whose components tend to degrade with use. Skilled pilots learn to compensate for degraded capability, nursing aircraft to achieve flight goals and successfully return to base, by taking full advantage of rich sensor data, human senses, intuition and experience. Increasing levels of automation, particularly for unmanned vehicles, result in limited operator visibility into the state of the system. This limited visibility complicates and may even exclude compensation for failure or degradation under such conditions or in harsh operating environments. Thus, although desirable results have been achieved in the reliability of aerospace products, improved abilities to assess and monitor system and sub-system status information may further improve a product's reliability.

SUMMARY OF THE INVENTION

The present invention is directed to apparatus and methods for assessing component health to permit product reconfiguration as needed, such as, for example, for assessing actuator health, diagnostics, prognosis, failures, and the like for reconfiguring a flight control system of an aircraft. Apparatus and methods in accordance with the present invention may advantageously improve a product's capability, performance, and reduce support costs, thereby improving the product's marketability to customers.

In one embodiment, a method of operating a product includes monitoring a first diagnostic information of a component of the product, and monitoring a second diagnostic information of a system that includes the component. The first and second diagnostic informations are then combined, and based at least partially on the combined first and second diagnostic information at least one of the component and the system are reconfigured.

BRIEF DESCRIPTION OF THE DRAWINGS

The preferred and alternative embodiments of the present invention are described in detail below with reference to the following drawings:

FIG. 3 is a representative list of monitored operating parameters of the method of FIG. 2 in accordance with another embodiment of the invention;

DETAILED DESCRIPTION OF THE INVENTION

The present invention relates to apparatus and methods for assessing component health to permit product reconfiguration as needed. Many specific details of certain embodiments of the invention are set forth in the following description and in FIGS. 1-5 to provide a thorough understanding of such embodiments. One skilled in the art, however, will understand that the present invention may have additional embodiments, or that the present invention may be practiced without several of the details described in the following description.

Generally, apparatus and methods in accordance with the invention may provide the capability to improve mission success rate of a product by integrating Integrated Vehicle Health Management (IVHM) and reconfigurable control. This combination of capabilities may advantageously provide improved reliability and capability while reducing support costs. In particular embodiments, for example, embodiments of the present invention may advantageously provide weapon system capability that can continue a mission even with enemy battle damage or control system failures by smartly utilizing the remaining undamaged control system components, as well as the capabilities of damaged or degraded systems.

Figure 1:
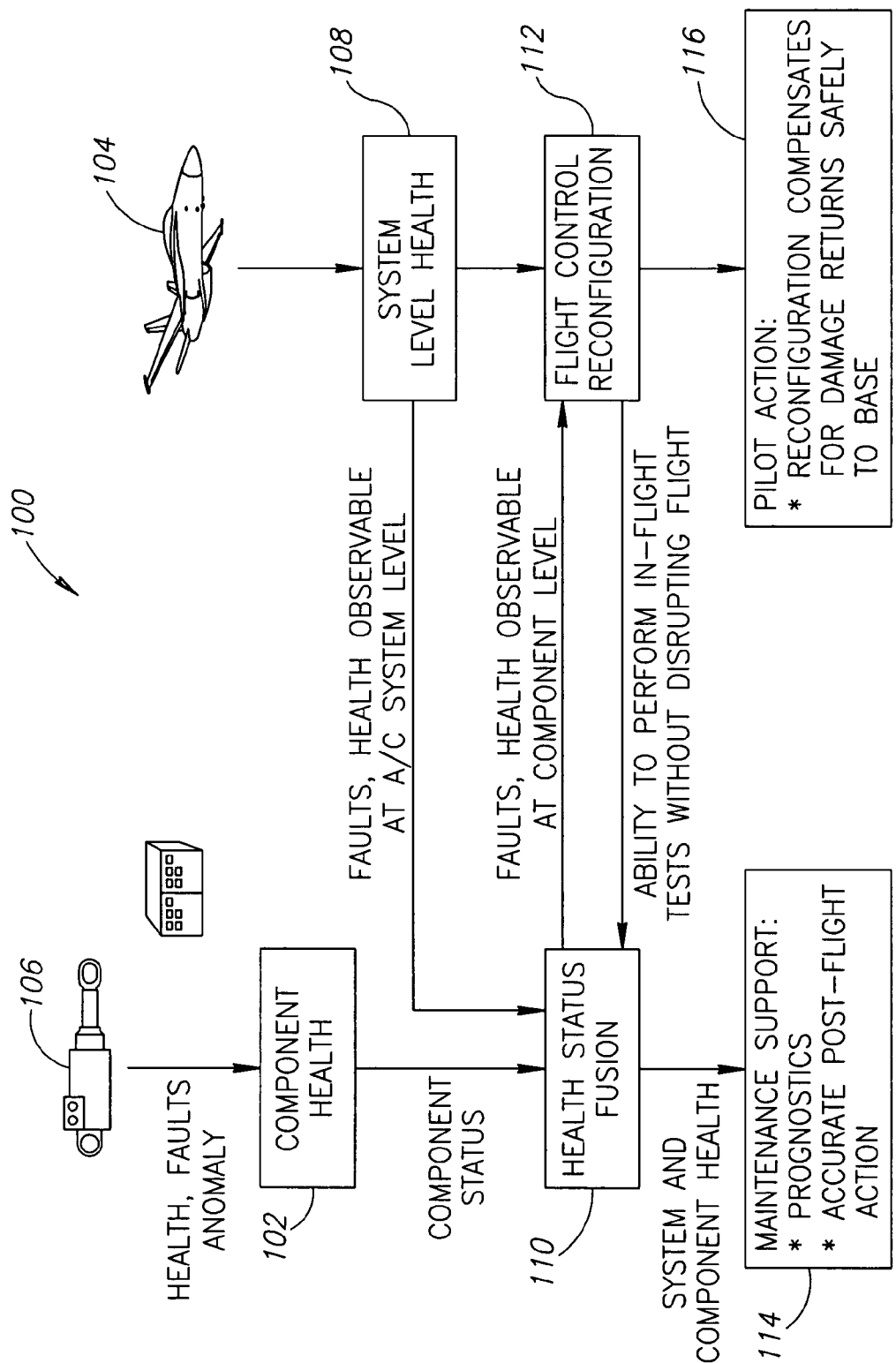
FIG. 1 is a schematic view of a method in accordance with an embodiment of the present invention.

FIG. 1 is a schematic view of a method 100 in accordance with an embodiment of the present invention. In this embodiment, the method 100 estimates the health and capability of a component of a product at a block 102. In one particular embodiment, for example, the product may be an aircraft 104, and the component may be an actuator 106 in a flight control system of the aircraft 104. At a block 108, the method 100 monitors system level diagnostic information. At a block 110, the system and component level monitoring and diagnostic information are combined. This combination or fusion improves the accuracy and enables a degree of confirmation in the detection, isolation and estimation of fault degree by exploiting all the evidence from different sources. For example, at the system level failure of the link from actuator to control surface will be detected as lack of control authority from that surface. Such a failure may not be detectable at the component level especially if actuator loading is not modeled. If load is modeled, the component level processing can be used to confirm the system level indication. Based on the combined system and component level information, a component control system or a sub-system that includes the component (e.g. flight control system), may be reconfigured at a block 112.

In one embodiment, for example, a flight control system may be reconfigured to take into account a degradation of an actuator 106 (e.g due to battle damage). The reconfiguration at block 112 may, in turn, be fed back into the health status fusion at the block 110. As further shown in FIG. 1, the system and component health information from block 110 may be input into a maintenance support block 114 to enable post-flight analysis and interpretation, and to assist in assessing the prognosis of the component and system. At a block 116, the reconfigured component control system may be operated in the reconfigured mode to continue overall performance of the product, such as allowing the aircraft 104 to continue flying and to return safely to base.

In one embodiment, the method 100 may expand current Built-In Test (BIT) capability in order to detect levels of degradation that can be used to reduce false alarms in the current BIT systems. These same degradations may be trended to provide a prognostic capability. In yet another embodiment, an Integrated Vehicle Health Management (IVHM) system with reconfigurable control may be integrated into the block 112, allowing the method 100 to perform structured tests of components and sub-systems including such components during flight, when actual flight loads and temperature environments are present. This may provide considerable advantages over alternate systems that perform tests under relatively benign conditions when no loads are present and where faults may not be correctly diagnosed or isolated. In a preferred embodiment, the control actions to support selected tests will not affect the flight response of the aircraft, so no compromise occurs to mission capability, and the pilot can continue operating the aircraft or performing a mission while the tests are in progress.

Figure 2:
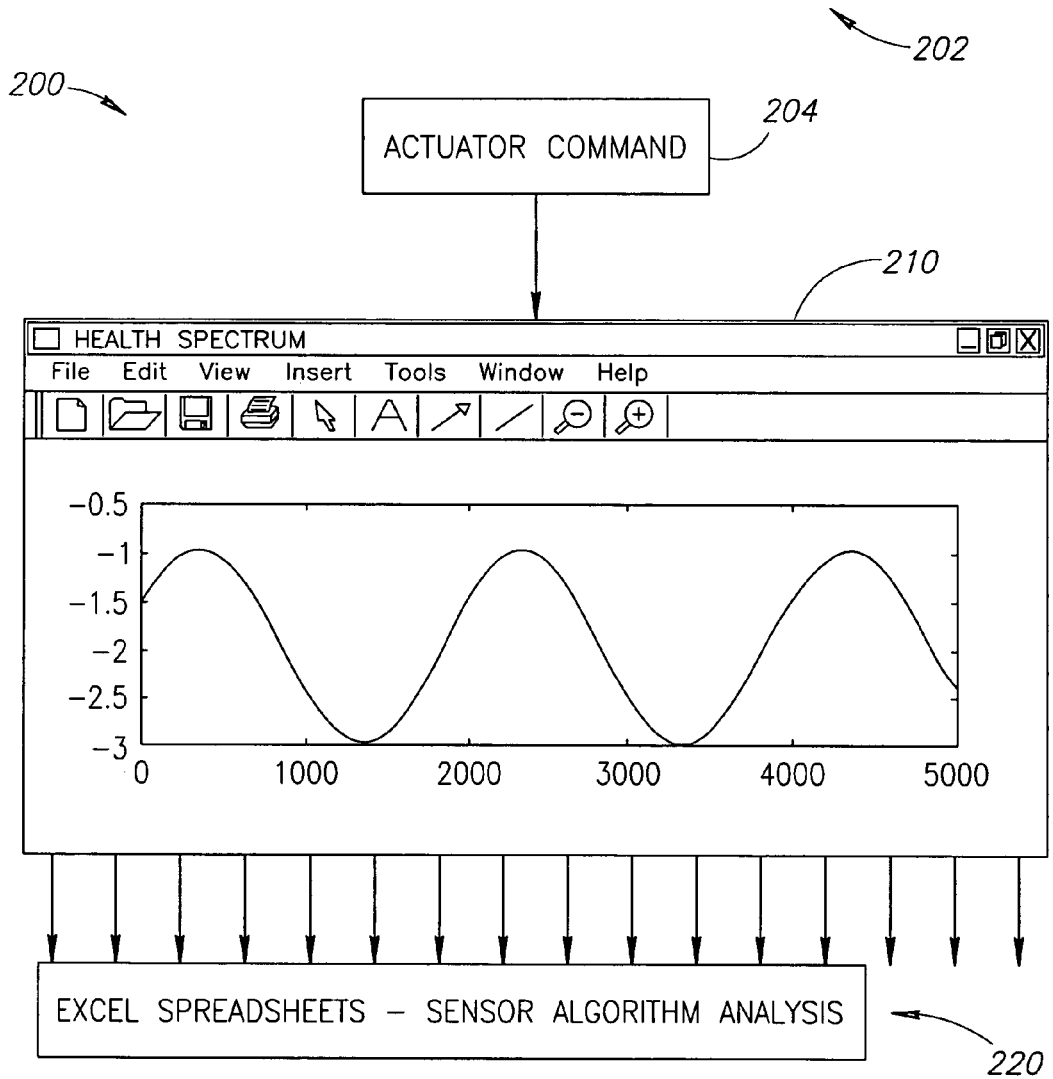
FIG. 2 is an embodiment of a health algorithm and a reconfiguration control process of the method of FIG. 1 in accordance with another embodiment of the invention.

FIG. 2 is an embodiment of a health algorithm and a reconfiguration control process 200 of the method 100 of FIG. 1 in accordance with another embodiment of the invention. In this embodiment, the actuator 106 (or other product component) is initially operating at a given set of operating conditions 202. Next, an actuator command 204 is input to the actuator 106, and a variety of operating parameters 210 of the actuator 106 are monitored. FIG. 3 is a representative list of monitored operating (or sensor) parameters 210 that are monitored during the method 200. As further shown in FIG. 2, the monitored operating parameters 210 of the actuator 106 are then output to an analysis algorithm 220. The analysis algorithm 220 may includes storing the monitored operating parameters 210 into one or more databases (or spreadsheets) and then performing analytical evaluations thereon, as described more fully below.

Figure 4:
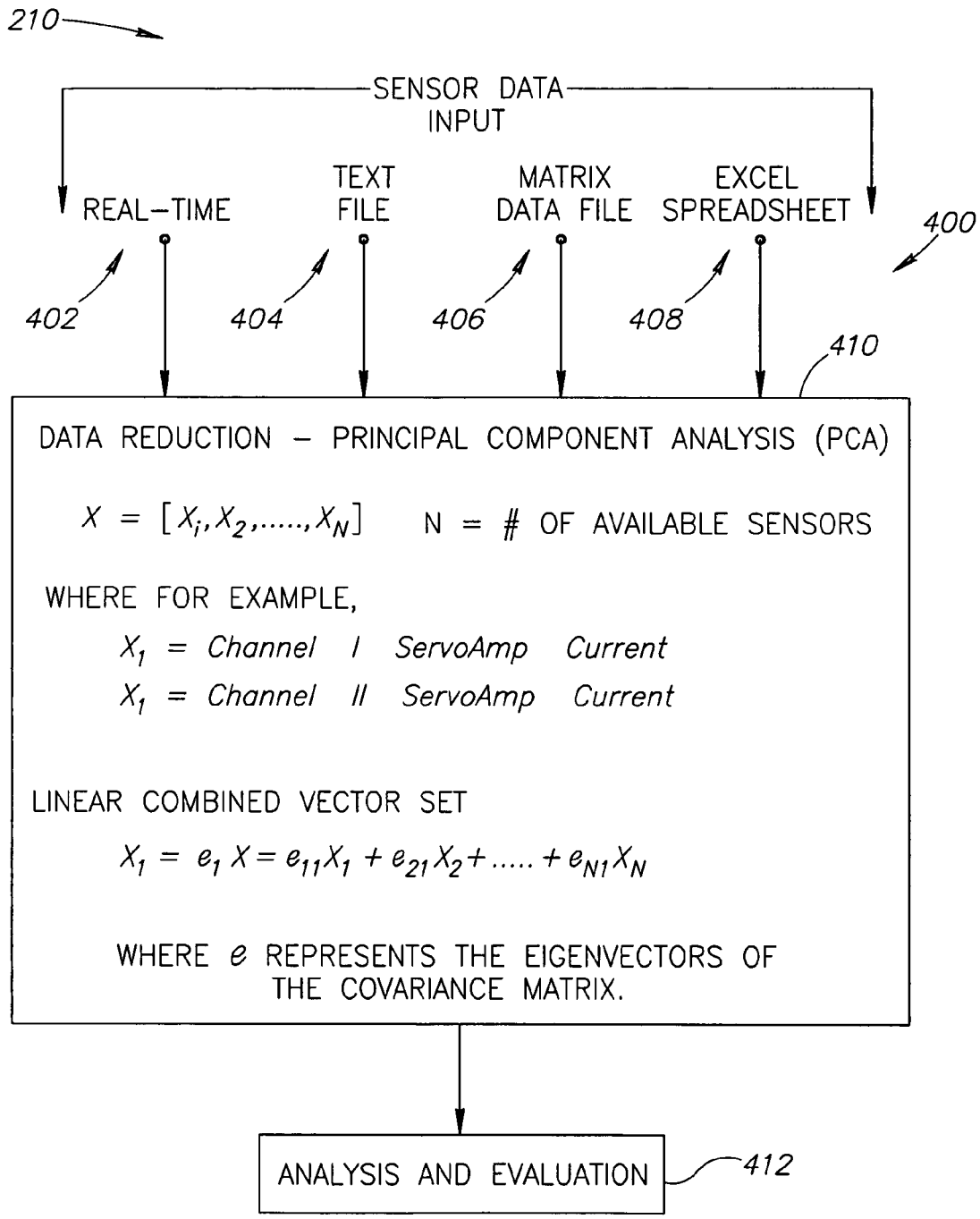
FIG. 4 is a flow diagram of a component analysis method in accordance with a further embodiment of the invention.

FIG. 4 is a flow diagram of a component analysis method 400 in accordance with a further embodiment of the invention. As shown in FIG. 4, the monitored operating parameters 210 may be input into the component analysis method 400 in a variety of ways, including via real-time input 402, text file 404, matrix data file 406, and spreadsheet (or other database) 408, or via combinations thereof. The monitored operating parameters 210 are provided to a principal component analysis (PCA) algorithm 410. An input vector X containing the input data from the N available sensors of monitored operating parameters 210 is formed. As shown in FIG. 4, the first value $X_1$ of the input vector X may represent, for example, the Channel I ServoAmp Current, and the second value $X_2$ of the input vector X may represent, for example, the Channel II ServoAmp Current, and so on. Next, a linear combined vector set Y is formed for a particular time i in accordance with the following Equation (1):

$$Y_i = e_i X = e_{1i} X_1 + e_{2i} X_2 + \ldots + e_{iN} X_N \qquad (1)$$

where e represents the eigenvectors of the covariance matrix. After formulating the monitored operating parameters 210 into the linear combined vector set Y, analysis and evaluation are preformed at a block 412, as described more fully below.

Figure 5:
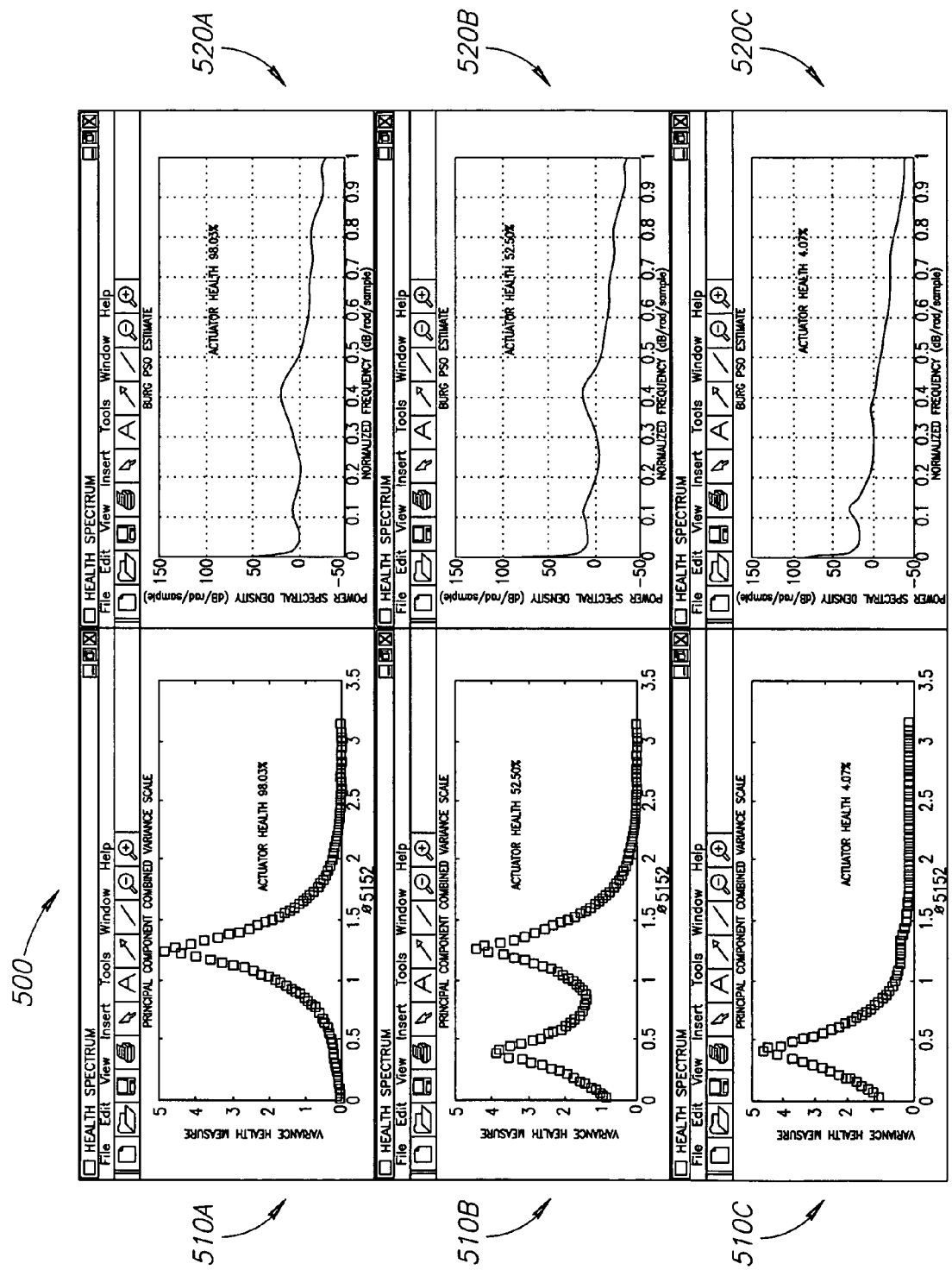
FIG. 5 is a series of graphs of a health measurement function and a health power spectrum for varying degrees of actuator health in accordance with a further embodiment of the invention.

FIG. 5 is a series of graphs 500 of a health measurement function 510 and a health power spectrum 520 for varying degrees of actuator health in accordance with a further embodiment of the invention. If $\lambda_1$ through $\lambda_i$ are defined to be the eigenvalues of the covariance ($\Sigma$), the health measure function 510 may be derived from the power spectrum breakpoints according to the following Equations (2):

$$hmf(\lambda) = \text{scale}(\lambda_{max}) \exp(BP(\lambda)) \qquad (2)$$

where BP is the power spectrum break points, and scale is the scale factor which is a function of the max eigenvalue value.

Similarly, another measure of health, the health power spectrum 520, is given by the following Equation (3):

$$S_{hps}(w) = \sum_{k=-\infty}^{\infty} R_{lcf}(k) e^{-jwk} \qquad (3)$$

where w is normalized frequency, $R_{lcf}$ is autocorrelation sequence, k is the summation index, and $e^{-jwk}$ is the complex exponentials used in the Discrete Fourier Transform.

Thus, as shown by Equation (3), the health power spectrum 520 is developed from the Fast-Fourier Transform (FFT) of the autocorrelation. It is derived from a linear combination of sensor values and influenced by the PCA reduction. These two estimators, the health measure function 510 and the health power spectrum 520, may then be combined to generate the health assessment parameter that is the output of the IVHM system.

Referring to FIG. 5, the left column of graphs show the normalized health measure function 510 changing as actuator health degrades from healthy (510A), degraded (510B), and failed (510C). The right column of graphs shows the normalized health power spectrum 520 for the actuator, again healthy (520A), degraded (520B), and failed (520C) going from top to bottom. The health power spectrum 520 shows a more subtle difference, but filtering and isolating to the frequencies of interest could make this more discernable to the eye. The two independent measures may be used independently, or alternately, in conjunction to amplify the algorithm's ability to discriminate healthy actuator behavior from degraded or failed behavior. The power spectrum identifies the break points for the health discrimination, which are then combined with scaling parameter generated from the eigenvalues to form a health assessment indicator.

Embodiments of methods and apparatus in accordance with the present invention may advantageously improve the capability of products by improving reliability. More specifically, the capabilities of aerospace products to complete designated missions may be improved, and support costs may be reduced. Embodiments in accordance with the present invention may improve the ability to diagnose and predict component failures, and may provide improved support for the coordination of tests with the control system.

While preferred and alternate embodiments of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method of operating an aircraft, comprising:
   monitoring operating parameters of a component of the aircraft;
   monitoring system-level health of an aircraft control system including the component, wherein the system health is monitored to determine break points for health discrimination;

processing the operating parameters and the system-level health to determine health of the component, including performing principal component analysis (PCA) to provide a reduced set of data, determining a scale factor from the PCA, and using the reduced set in conjunction with the system level health to determine a health assessment parameter for the component, wherein the breakpoints are combined with the scale factor to determine the health assessment parameter; and reconfiguring at least one of the component and the flight control system to compensate for the component during operation if the health assessment parameter indicates a degradation of the component.

2. The method of claim 1, wherein reconfiguring at least one of the component and the system includes reconfiguring the flight control system to take into account a degradation of an actuator.

3. The method of claim 1, further comprising feeding back the reconfiguring of the at least one of the component and the system into the processing of the operating parameters and the system-level health.

4. The method of claim 1, further comprising inputting the system and component health into maintenance support.

5. The method of claim 1, further comprising detecting a level of degradation of the component that can be used to reduce false alarms in a Built-In Test system.

6. The method of claim 1, wherein reconfiguring at least one of the component and the system includes reconfiguring at least one of the component and the system using an integrated vehicle health management system.

7. The method of claim 1, further comprising integrating an integrated vehicle health management system with reconfigurable control, and performing tests of at least one of the component and the system during actual operation of the product.

8. The method of claim 1, wherein eigenvalues of a covariance matrix are computed from the PCA, and wherein the eigenvalues are used to compute the health assessment parameter.

9. The method of claim 4, wherein the maintenance support includes at least one of enable post-flight analysis and interpretation, and prognosis of the component and system.

10. The method of claim 5, further comprising trending one or more degradations to provide a prognostic capability.

11. The method of claim 8, wherein computing the health assessment parameter includes computing a health measurement function as $\text{scale}(\lambda_{max})\exp(BP(\lambda))$.

12. The method of claim 8, wherein computing the health assessment function includes computing a health power spectrum as a function of the eigenvalues of a covariance matrix.

13. The method of claim 12, wherein the health power spectrum is determined as $$S_{hps}(w) = \sum_{k=-\infty}^{\infty} R_{lcf}(k)e^{-jwk}.$$

14. The method of claim 12, wherein the health power spectrum is developed from a Fast-Fourier Transform of an autocorrelation of an input vector X and a linear combined vector set Y.

* * * * *

UNITED STATES PATENT AND TRADEMARK OFFICE
CERTIFICATE OF CORRECTION

| | | |
|---|---|---|
| PATENT NO. | : 7,689,383 B2 | Page 1 of 1 |
| APPLICATION NO. | : 10/717736 | |
| DATED | : March 30, 2010 | |
| INVENTOR(S) | : Scott E. Black | |

It is certified that error appears in the above-identified patent and that said Letters Patent is hereby corrected as shown below:

Col. 1, Line 4-5, please insert the following government rights clause between the Title and the Field of the Invention:

--This invention was made with Government support under contract no. N00421-00-3-0123 awarded by the U.S. Navy. The Government has certain rights in this invention.--

Signed and Sealed this
Fifth Day of April, 2011

David J. Kappos
*Director of the United States Patent and Trademark Office*